(12) United States Patent
Xu et al.

(10) Patent No.: US 11,249,603 B2
(45) Date of Patent: Feb. 15, 2022

(54) METHOD OF FORMING TOUCH CONTROL MODULE, TOUCH CONTROL MODULE AND TOUCH CONTROL DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Wenjie Xu, Beijing (CN); Weiwei Chu, Beijing (CN); Jing Wang, Beijing (CN); Feifei Yu, Beijing (CN); Tsungchieh Kuo, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/998,749

(22) Filed: Aug. 20, 2020

(65) Prior Publication Data
US 2021/0055830 A1    Feb. 25, 2021

(30) Foreign Application Priority Data
Aug. 22, 2019  (CN) .......................... 201910777785.6

(51) Int. Cl.
*G06F 3/044*  (2006.01)
(52) U.S. Cl.
CPC .......... *G06F 3/0443* (2019.05); *G06F 3/0445* (2019.05); *G06F 2203/04102* (2013.01); *G06F 2203/04103* (2013.01); *G06F 2203/04111* (2013.01); *G06F 2203/04112* (2013.01)

(58) Field of Classification Search
CPC ................. G06F 3/0443; G06F 3/0445; G06F 2203/04102; G06F 2203/04103; G06F 2203/04111; G06F 2203/04112; G06F 3/041
See application file for complete search history.

(56) References Cited

U.S. PATENT DOCUMENTS

2011/0223389 A1*  9/2011  Lin ........................... B32B 7/12
                                                       428/174
2012/0231245 A1*  9/2012  Kim ..................... G06F 1/1626
                                                       428/212

(Continued)

FOREIGN PATENT DOCUMENTS

CN    106919284    *  7/2017
CN    108288638    *  7/2018

*Primary Examiner* — Md Saiful A Siddiqui
(74) *Attorney, Agent, or Firm* — Muncy, Geissler, Olds & Lowe, P.C.

(57) ABSTRACT

A method of forming a touch control module, a touch control module, and a touch display device are provided. The method includes: providing a rigid base substrate; forming a base layer on the rigid base substrate; forming a touch functional layer at a side of the base layer away from the rigid base substrate; separating the rigid base substrate from the base layer, to form a touch functional component including the base layer and the touch functional layer; and adhering the touch functional component to a display functional component of a display device through an adhesive, to form the touch control module.

18 Claims, 5 Drawing Sheets

(56) References Cited

U.S. PATENT DOCUMENTS

| | | | |
|---|---|---|---|
| 2013/0222345 A1* | 8/2013 | Chuang | G06F 3/0443 |
| | | | 345/175 |
| 2015/0042908 A1* | 2/2015 | Wang | G06F 3/041 |
| | | | 349/12 |
| 2015/0293646 A1* | 10/2015 | Chen | G06F 3/0446 |
| | | | 345/175 |
| 2015/0307732 A1* | 10/2015 | Chen | C09D 133/06 |
| | | | 428/174 |
| 2016/0043336 A1* | 2/2016 | Kim | H01L 51/003 |
| | | | 257/40 |
| 2018/0129317 A1* | 5/2018 | Ryu | B32B 7/06 |
| 2018/0247807 A1* | 8/2018 | He | G06F 3/0445 |
| 2019/0227659 A1* | 7/2019 | Guo | G06F 3/0414 |
| 2019/0286257 A1* | 9/2019 | Choi | B32B 27/281 |

* cited by examiner

METHOD OF FORMING TOUCH CONTROL MODULE, TOUCH CONTROL MODULE AND TOUCH CONTROL DISPLAY DEVICE

CROSS REFERENCE OF RELATED APPLICATION

The present disclosure claims a priority to Chinese Patent Application No. 201910777785.6 filed on Aug. 22, 2019, the disclosures of which are incorporated in their entirety by reference herein.

TECHNICAL FIELD

The present disclosure relates to field of touch technology, and in particular to a method of forming a touch control module, a touch control module, and a touch display device.

BACKGROUND

Flexible display devices have become the development trend of display devices, but there are still many difficulties to be overcome in the implement of flexible display devices, such as the thickness of the touch control module of the flexible display device. At present, a commonly used method of forming a touch control module of a flexible display device is as follows: first, a touch functional layer is formed on a base film to obtain a touch control module, and then the touch control module is adhered to a display device through an optical transparent adhesive (OCA), the base film is usually formed of cycloolefin polymer (COP), and the thicknesses of the base film and OCA are both large (the thickness of OCA is usually greater than 200 microns), which increase the overall thickness of the flexible display device and effects the folding performance.

SUMMARY

A method of forming a touch control module is provided in the present disclosure, including:
providing a rigid base substrate;
forming a base layer on the rigid base substrate;
forming a touch functional layer at a side of the base layer away from the rigid base substrate;
separating the rigid base substrate from the base layer, to form a touch functional component including the base layer and the touch functional layer; and
adhering the touch functional component to a display functional component of a display device through an adhesive, to form the touch control module.

Optionally, prior to the forming the base layer on the rigid base substrate, the method further includes:
forming a detachable layer on the rigid base substrate;
where the forming the base layer on the rigid base substrate further includes:
forming the base layer at a side of the detachable layer away from the rigid base substrate;
where the separating the rigid base substrate from the base layer further includes:
separating the detachable layer from the base layer.

Optionally, the base layer completely covers a surface of the detachable layer away from the rigid base substrate and lateral surfaces of the detachable layer.

Optionally, a material of the base layer includes polyimide, the touch functional layer includes a touch electrode pattern;

the forming the touch functional layer at the side of the base layer away from the rigid base substrate further includes:
forming the touch electrode pattern at the side of the base layer away from the rigid base substrate.

Optionally, the touch electrode pattern is formed of a transparent metal oxide;

subsequent to the forming the base layer on the rigid base substrate, the method further includes:
forming an anti-imaging layer at the side of the base layer away from the rigid base substrate.

Optionally, the adhering the touch functional component to the display functional component of the display device through the adhesive further includes:
providing the display functional component;
coating the adhesive onto the display functional component;
adhering the touch functional component onto the display functional component through the adhesive; and
curing the adhesive.

Optionally, the forming the touch functional layer at the side of the base layer away from the rigid base substrate further including:
forming the touch electrode pattern at a side of the anti-imaging layer away from the rigid base substrate, where the touch electrode pattern includes driving electrodes and sensing electrodes, the touch electrode pattern is formed of a transparent metal oxide material;
forming a touch electrode wiring;
forming a first insulating layer, and forming, in the first insulating layer, bridging contact via-holes and a first bonding area via-hole, where the bridging contact via-holes are above the driving electrodes or the sensing electrodes, and the first bonding area via-hole is above the touch electrode wiring;
forming a bridging pattern, where the bridging pattern is connected to the driving electrodes or the sensing electrodes through the bridging contact via-holes;
forming a second insulating layer, and forming a second bonding area via-hole in the second insulating layer, where the second bonding area via-hole is in communication with the first bonding area via-hole, and the touch functional layer consists of the anti-imaging layer, the touch electrode pattern, the touch electrode wiring, the first insulating layer, the bridging pattern and the second insulating layer.

Optionally, the forming the touch functional layer at the side of the base layer away from the rigid base substrate further includes:
forming a first touch electrode pattern and a first touch electrode wiring at the side of the base layer away from the rigid base substrate;
forming a first blackened layer pattern at a side of the first touch electrode pattern and the first touch electrode wiring away from the rigid base substrate, where an orthographic projection of the first blackened layer pattern onto the rigid base substrate overlaps with orthographic projections of the first touch electrode pattern and the first touch electrode wiring onto the rigid base substrate;
forming a first insulating layer, and forming a first bonding area via-hole in the first insulating layer, where the first bonding area via-hole is above the first touch electrode wiring;
forming a second touch electrode pattern and a second touch electrode wiring, where the first touch electrode pattern and the second touch electrode pattern form a touch electrode pattern with a metal grid structure;

forming a second blackened layer pattern at a side of the second touch electrode pattern and the second touch electrode wiring away from the rigid base substrate, where an orthographic projection of the second blackened layer pattern onto the rigid base substrate overlaps with orthographic projections of the second touch electrode pattern and the second touch electrode wiring onto the rigid base substrate;

forming a second insulating layer, and forming a second bonding area via-hole in the second insulating layer, where the second bonding area via-hole is above the first touch electrode wiring and the second touch electrode wiring, the touch functional layer consists of the first touch electrode pattern, the first touch electrode wiring, the first blackened layer pattern, the first insulating layer, the second touch electrode pattern, the second touch electrode wiring, the second blackened layer pattern and the second insulating layer.

Optionally, an orthographic projection of the detachable layer onto the rigid base substrate is within an orthographic projection of the base layer onto the rigid base substrate.

Optionally, at least a portion of the base layer extends to the rigid base substrate and is in direct contact with the rigid base substrate, to enclose the detachable layer into the base layer.

Optionally, subsequent to the forming the touch electrode pattern at the side of the base layer away from the rigid base substrate, the method further includes:

performing an annealing process to anneal the touch electrode pattern.

Optionally, a material of the detachable layer includes polyacrylate or unsaturated polyester.

Optionally, a material of the anti-imaging layer includes SiNxOy.

A touch control module is further provided in the present disclosure, including:

a display functional component of a display device;

a touch functional component, arranged on the display functional component and adhered to the display functional component through an adhesive, where the touch functional component includes: a base layer and a touch functional layer on the base layer.

Optionally, a thickness of the base layer is 1 to 5 microns.

Optionally, a thickness of the adhesive is less than 10 microns.

Optionally, the adhesive includes acrylic resin, polyurethane or ethoxyline resin.

Optionally, the display functional component is a polarizer, a barrier layer or a cover plate.

A touch display device is further provided in the present disclosure, including a display device and the touch control module adhered to the display device hereinabove.

BRIEF DESCRIPTION OF THE DRAWINGS

The drawings are only used for the illustrating the embodiments, and are not to limit the present disclosure. Throughout the drawings, the same reference symbols are used to denote the same components.

DETAILED DESCRIPTION

The technical solutions in the embodiments of the present disclosure will be clearly and completely described below in conjunction with the drawings in the embodiments of the present disclosure. Obviously, the described embodiments are part of the embodiments of the present disclosure, rather than all of them. Based on the embodiments of the present disclosure, all other embodiments obtained by those of ordinary skill in the art without creative work shall fall within the scope of the present disclosure.

Figure 1:
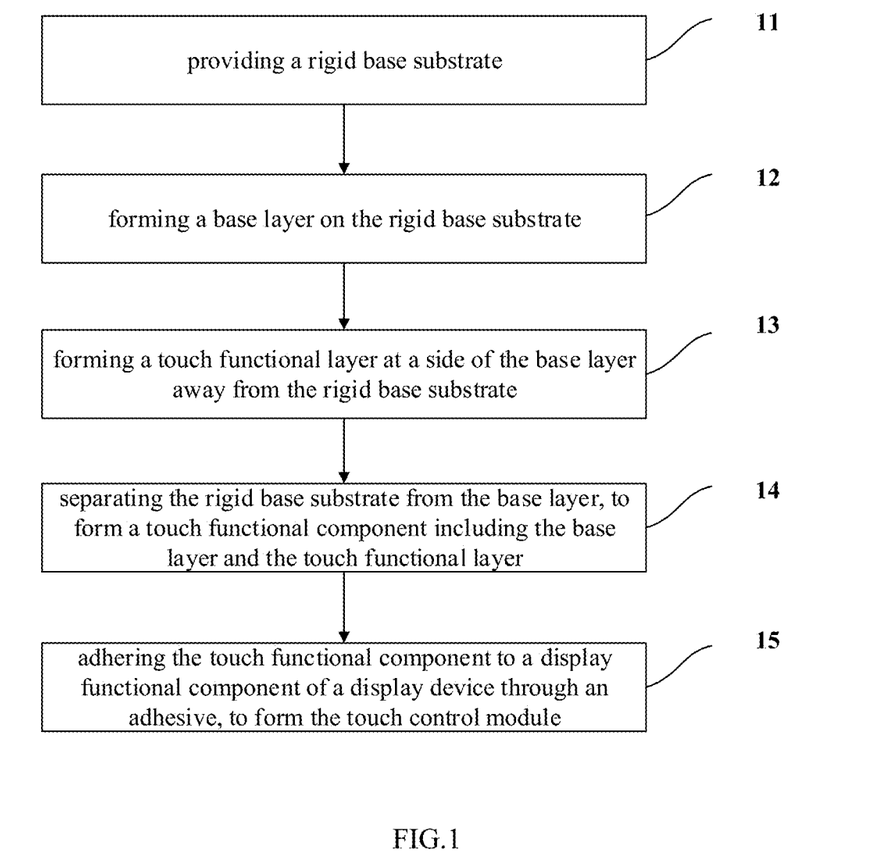
FIG. 1 is a schematic flowchart of a method of forming a touch control module in an embodiment of the present disclosure.

Referring to FIG. 1 which is a schematic flowchart of a method of forming a touch control module in an embodiment of the present disclosure. The method includes the following Step 11 to Step 15.

Step 11: providing a rigid base substrate 101;

The rigid base substrate may be, for example, a glass substrate or a ceramic substrate.

Step 12: forming a base layer 103 on the rigid base substrate.

Step 13: forming a touch functional layer at a side of the base layer away from the rigid base substrate.

The base layer is used to carry the touch functional layer.

The touch functional layer includes touch electrodes 105 and touch electrode wiring 106 connected to the touch electrode 105.

Step 14: separating the rigid base substrate 101 from the base layer 103, to form a touch functional component 100 including the base layer 103 and the touch functional layer;

Step 15: adhering the touch functional component to a display functional component 200 of a display device through an adhesive 300, to form the touch control module.

The adhesive may be formed of materials such as acrylic resin, polyurethane, or ethoxyline resin. In some embodiments, the thickness of the adhesive is less than 10 μm.

According to the embodiment of the present disclosure, the touch functional component is adhered to the display functional component of the display device through an adhesive. Compared with the related art where the adhering is through the OCA, the adhesive is thinner than OCA. Therefore, the overall thickness of the display device may be reduced. If the display device is a flexible display device, the thickness of the display device is reduced, so the folding performance may be improved.

In some embodiments of the present disclosure, the display functional component is a polarizer, barrier film or cover plate of a display device. The barrier layer is a film layer covering the display device for encapsulating the display device, and is used for isolating water and oxygen. The cover plate may be a rigid cover plate or a flexible cover plate, such as a transparent polyimide (c-PI) flexible cover plate.

In some embodiments of the present disclosure, the touch functional component may be first adhered onto the display functional component through an adhesive to obtain a touch control module, and then the touch control module may be adhered onto the display device. In this way, since the forming process of the touch control module is independent from the forming process of the display device, the overall yield will be greatly improved, which may effectively reduce the production cost of the product. In addition, the display functional component may also be adhered onto the display device first, and then the touch functional component may be adhered onto the display functional component through an adhesive.

In some embodiments of the present disclosure, the base layer may be formed by coating.

In some embodiments of the present disclosure, the thickness of the base layer is 1 μm to 5 μm.

In some embodiments of the present disclosure, the material of the base layer includes polyimide (PI), and the material of the base layer may be all polyimide, or polyimide may be used as the main material and doped with other materials. Compared with the base film formed of cycloolefin polymer (COP) in the related art, the thickness of the base layer is greatly reduced, so that the thickness of the touch control module may be reduced.

In the embodiment of the present disclosure, when the material of the base layer includes polyimide, since polyimide has better high temperature resistance and chemical resistance compared with the base film formed of cycloolefin polymer in the related art. Compared with the touch control module forming process using base film, the process temperature and chemical substances are less restricted, without film shrinkage, and the applicable process temperature range is wider. At the same time, the touch electrode pattern is usually formed of transparent metal oxide materials such as indium tin oxide (ITO), and the square resistance of the touch electrode pattern is relatively large. In the embodiment of the present disclosure, since the base layer is resistant to high temperature, after the touch electrode pattern of the touch functional layer is fabricated on the bottom layer, the touch electrode pattern is annealed through an annealing process. The annealing process can greatly reduce the square resistance of the touch electrode pattern and improve the performance of the touch control module.

In the embodiment of the present disclosure, after the preparation of the base layer is completed as described above, a baking process may be performed to cure the base layer.

In some embodiments, the forming method further includes:

forming a detachable layer 102 on the rigid base substrate 101;

the forming the base layer on the rigid base substrate includes:

forming the base layer at a side of the detachable layer away from the rigid base substrate;

the separating the rigid base substrate from the base layer includes:

separating the detachable layer from the base layer.

The detachable layer is used to separate the base layer from the rigid base substrate to avoid damage to the protective layer during separation.

In some embodiments of the present disclosure, the detachable layer may be formed by coating.

In some embodiments of the present disclosure, the detachable layer is formed of materials such as polyacrylic resin or unsaturated polyester.

In some embodiments of the present disclosure, the thickness of the detachable layer is 300 to 500 nm. Optionally, it may be 400 nm.

In some embodiments of the present disclosure, the base layer completely covers the surface of the detachable layer away from the rigid base substrate and the lateral surfaces thereof. Since the detachable layer is formed of materials such as polyacrylic resin or unsaturated polyester, it is easily corroded by chemical reagents in the subsequent forming process. Therefore, in the embodiment of the present disclosure, the base layer completely covers the side surface of the detachable layer away from the rigid base substrate and the lateral surfaces thereof, thereby protecting the detachable layer.

In some embodiments of the present disclosure, after forming a base layer on the rigid base substrate, the method further includes: forming an anti-imaging layer 104 (IML) at the side of the base layer away from the rigid base substrate, and the anti-imaging layer is used to reduce the difference in reflectivity between the touch electrode pattern (especially the touch electrode pattern formed of transparent metal oxide such as ITO) and the place where the touch electrode pattern is not provided. The anti-imaging layer may be formed of materials such as silicon oxynitride (SiNxOy).

In some embodiments of the present disclosure, the touch electrode pattern may use a bridging structure, including driving electrodes and sensing electrodes. Both driving electrodes and sensing electrodes are formed of transparent metal oxide materials such as ITO. The driving electrodes and sensing electrodes are in the same layer. One of the driving electrodes and sensing electrodes is disconnected, and connected through a bridging structure at a different layer from the driving electrodes and sensing electrodes.

Figure 2A:
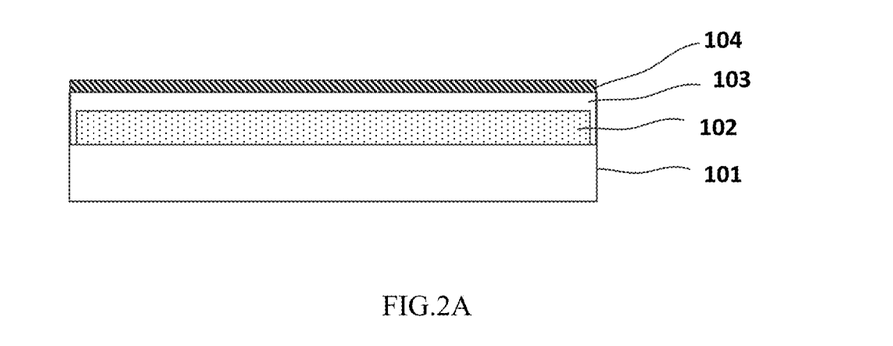
FIGS. 2A-2F are schematic flowcharts of a method of forming a touch functional layer in an embodiment of the present disclosure.
Figure 2B:
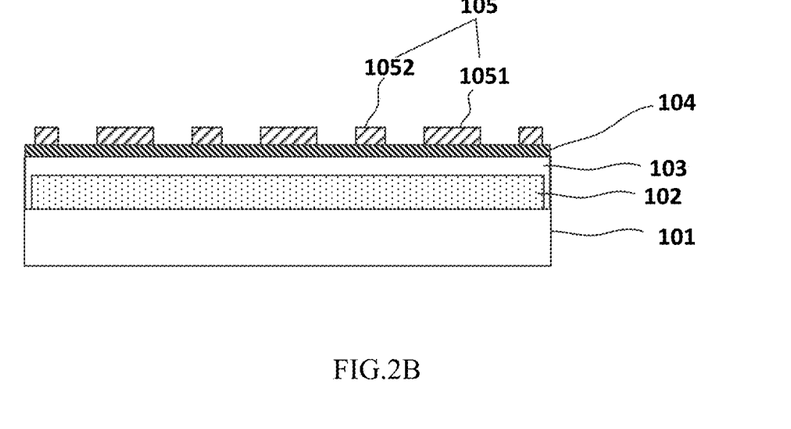

In some embodiments of the present disclosure, referring to FIGS. 2A-2F, the forming the touch functional layer on the base layer includes:

Step 131A: as shown in FIG. 2, forming an anti-imaging layer 104 on the rigid base substrate 101 on which the detachable layer 102 and the base layer 103 are formed;

The base layer 103 completely covers the surface of the detachable layer 102 away from the rigid base substrate 101 and lateral surfaces thereof to prevent the detachable layer 102 from being corroded by chemical reagents in the subsequent forming process.

Step 132A: as shown in FIG. 2A, a touch electrode pattern 105 is formed at the side of the anti-imaging layer 104 away from the rigid base substrate 101, and the touch electrode pattern 105 includes a plurality of driving electrodes 1051 and a plurality of sensing electrodes 1052 arranged in the same layer. In the embodiment of the present disclosure, the driving electrodes 1051 need to be bridged by a bridging pattern. Of course, in some other embodiments of the present disclosure, the sensing electrodes may also need to be bridged by a bridging pattern;

The touch electrode pattern 105 is formed of transparent metal oxide materials such as ITO.

The thickness of the touch electrode pattern 105 may be 1300-1400 Å.

The steps may include: transparent metal oxide material sputtering (Sputter), coating photoresist, Photo, development, etching (Etching), stripping photoresist and other processes.

Figure 2C:
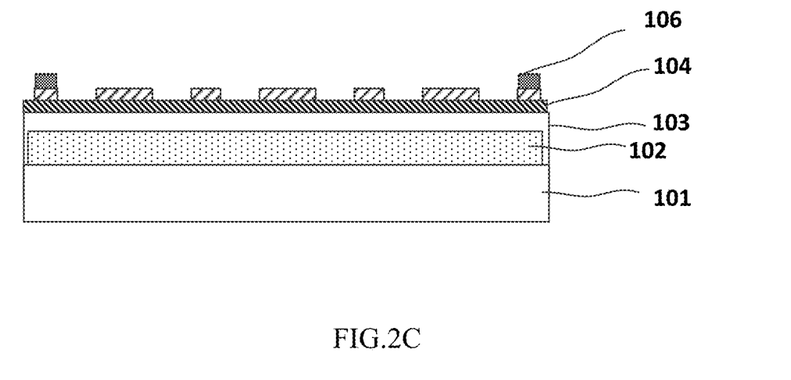

Step 133A: as shown in FIG. 2C, forming the touch electrode wiring 106.

The touch electrode wiring 106 may be formed of a metal material, such as Al, Cu, or Ag.

The thickness of the touch electrode wiring may be 1900-2100 Å.

The steps may include: metal material sputtering, photoresist coating, Photo, development, etching, and photoresist stripping.

Figure 2D:
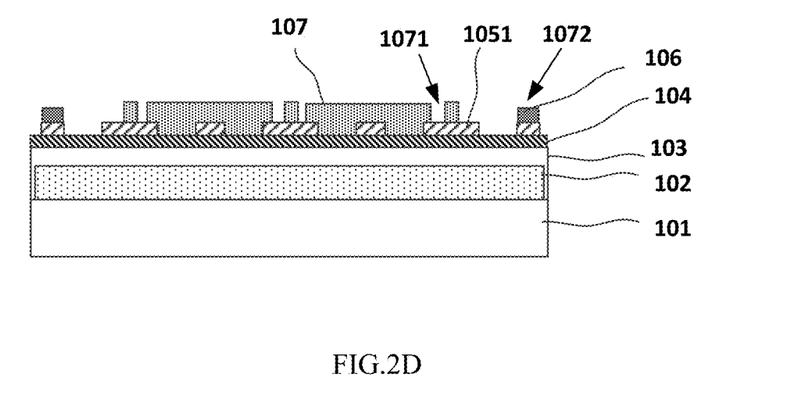

Step 134A: as shown in FIG. 2D, a first insulating layer (Insulator) 107 is formed, and a bridging contact via-hole 1071 and a first bonding area via-hole are formed on the first insulating layer 107.

The first insulating layer 107 is used to isolate the touch electrode pattern 104 from the subsequently formed bonding pattern, to prevent short circuits, and the thickness of the first insulating layer 107 may be 1-3 μm.

The specific forming steps may include: insulating material coating, Photo, development, baking and other processes.

In the embodiment of the present disclosure, the bridging contact via-hole 1071 is above the driving electrode 1051, and is used to connect the driving electrode 1051 to the subsequently formed bonding pattern.

The first bonding area via-hole is above the touch electrode wiring 106 and is used for subsequent bonding of the touch electrode wiring 106 to the touch driving chip.

Figure 2E:
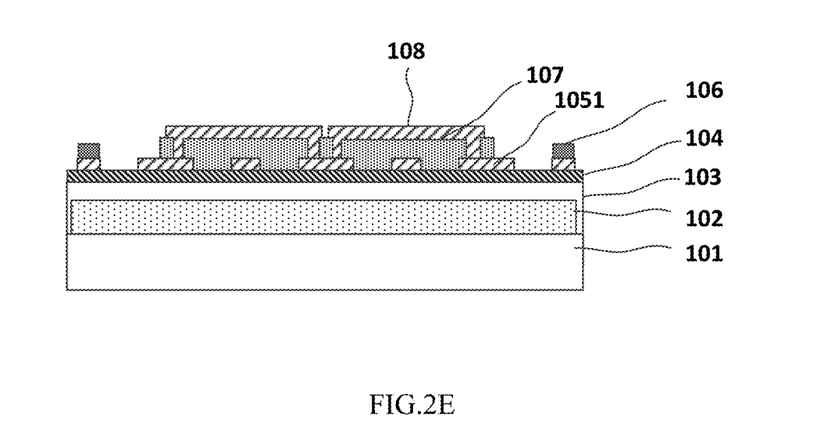

Step 135A: as shown in FIG. 2E, forming a bridging pattern 108 that connects the disconnected driving electrodes 1051 through the bridging contact via-holes.

The bridging pattern 108 may be formed of transparent metal oxide materials such as ITO, or may be formed of metal materials. At the same time, the bridging pattern 108 may also be made in the same layer as the touch electrode wiring to reduce the number of masks.

When the bridging pattern 108 is formed of transparent metal oxide materials such as ITO, the thickness thereof may be 1300-1400 Å.

When the bridging pattern 108 is formed of a transparent metal oxide material such as ITO, the specific forming steps may include: sputtering of the transparent metal oxide material, coating photoresist, Photo, development, etching, and stripping the photoresist.

Figure 2F:
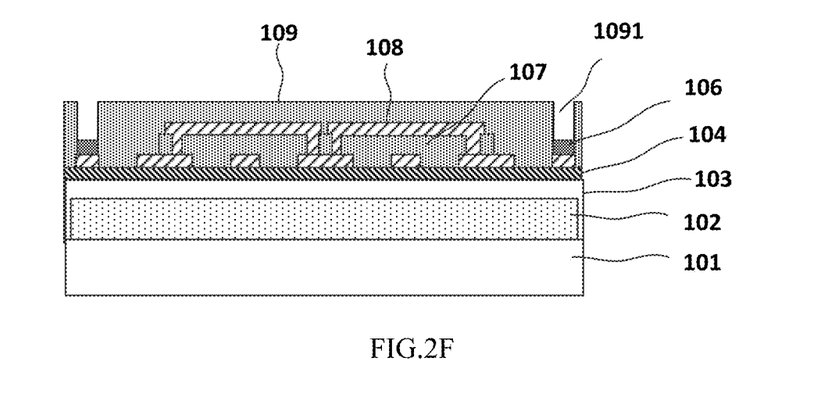

Step 136A: as shown in FIG. 2F, a second insulating layer 109 is formed, and a second bonding area via-hole 1091 is formed in the second insulating layer 109, and the bonding area via-hole 1091 is in communication with a first bonding area via-hole in the first insulating layer 107.

The second insulating layer 109 serves as a protective layer.

The specific forming steps may include: insulating material coating, Photo, development, baking and other processes.

In some embodiments of the present disclosure, the touch electrode pattern may adopt a Metal Mesh structure, including driving electrodes and sensing electrodes arranged in different layers, and the driving electrodes and sensing electrodes are formed of metal materials.

In some embodiments of the present disclosure, if the touch electrode pattern adopts a metal mesh structure, the method may further include: forming a blackened layer at a side of the touch electrode pattern away from the rigid base substrate, and the blackened layer is used to prevent the touch electrode pattern of the metal mesh structure from reflecting ambient light. The blackened layer may be formed of materials such as niobium molybdenum oxide (MoNbOx). Because the touch control module is adhered to the outside surface of the display device, the position of the blackened layer is determined according to the position of the adhered touch control module, and the blackened layer may also be arranged on the top and bottom of the metal grid.

Figure 4A:
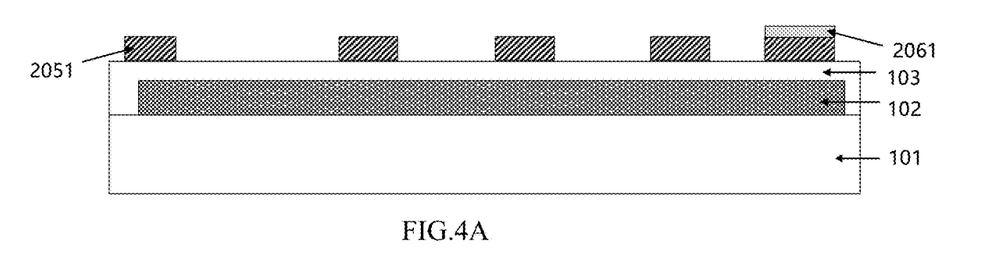
FIGS. 4A-4G are schematic flowcharts of a method of forming a touch functional layer in an embodiment of the present disclosure.

In some embodiments of the present disclosure, the forming the touch functional layer on the base layer further includes:

Step 131B: as shown in FIG. 4A, forming a first touch electrode pattern 2051 and a first touch electrode wiring 2061 on the rigid base substrate with the detachable layer and the base layer, where the first touch electrode pattern 2051 is one of a driving electrode and a sensing electrode, the first touch electrode pattern 2051 is connected to the first touch electrode wiring 2061 and is formed of metal such as Mo/Al/Mo, Cu, Ag, etc.

The specific steps may include: metal material sputtering, photoresist coating (PR), Photo, development, Etching, Stripping photoresist and other processes.

Figure 4B:
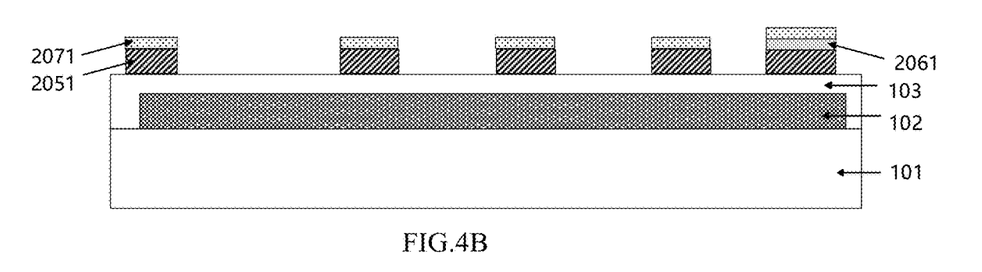

Step 132B: as shown in FIG. 4B, forming a first blackened layer pattern 2071 at a side of the first touch electrode pattern 2051 and the first touch electrode wiring 2061 away from the rigid base substrate, where an orthographic projection of the first blackened layer pattern 2071 onto the rigid base substrate overlaps with orthographic projections of the first touch electrode pattern 2051 and the first touch electrode wiring 2061 onto the rigid base substrate.

Figure 4C:
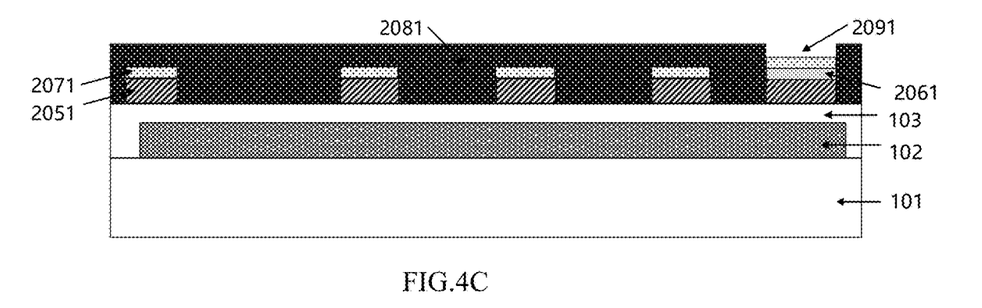

Step 133B: as shown in FIG. 4C, forming a first insulating layer 2081 (Insulator), and forming a first bonding area via-hole 2091 in the first insulating layer 2081, where the first bonding area via-hole 2091 is above the first touch electrode wiring.

The specific forming steps may include: insulating material coating, Photo, development, baking and other processes.

Figure 4D:
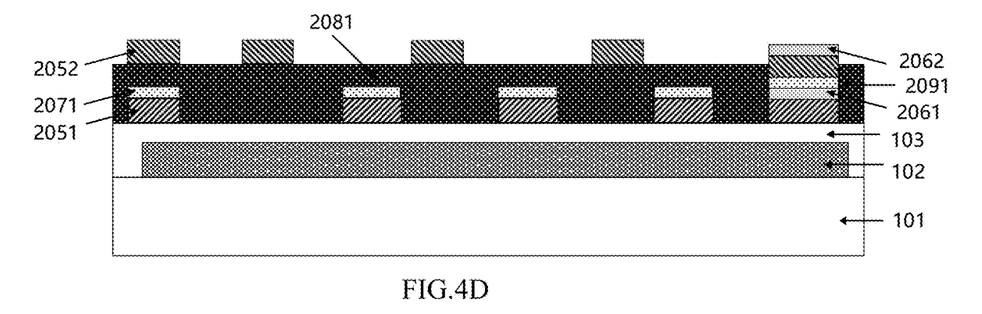

Step 134B: as shown in FIG. 4D, forming a second touch electrode pattern 2052 and a second touch electrode wiring 2062, where the second touch electrode pattern 2052 is the other of the driving electrode and the sensing electrode, the second touch electrode pattern 2052 and the second touch electrode wiring 2062 are connected and formed of metal, such as Mo/Al/Mo, Cu, Ag, etc.

The specific steps may include: metal material sputter, photoresist coating (PR), Photo, development, Etching, Stripping photoresist and other processes.

Figure 4E:
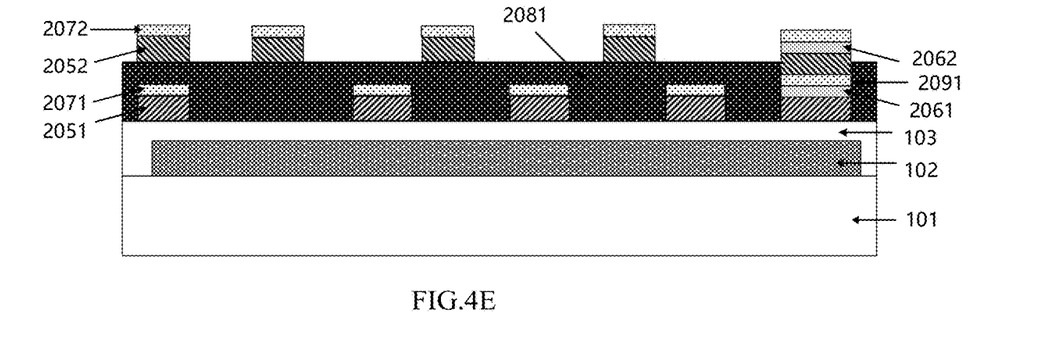

Step 135B: as shown in FIG. 4E, forming a second blackened layer pattern 2072 at a side of the second touch electrode pattern 2052 and the second touch electrode wiring 2062 away from the rigid base substrate, where an orthographic projection of the second blackened layer pattern 2072 onto the rigid base substrate overlaps with orthographic projections of the second touch electrode pattern 2052 and the second touch electrode wiring 2062 onto the rigid base substrate.

Figure 4F:
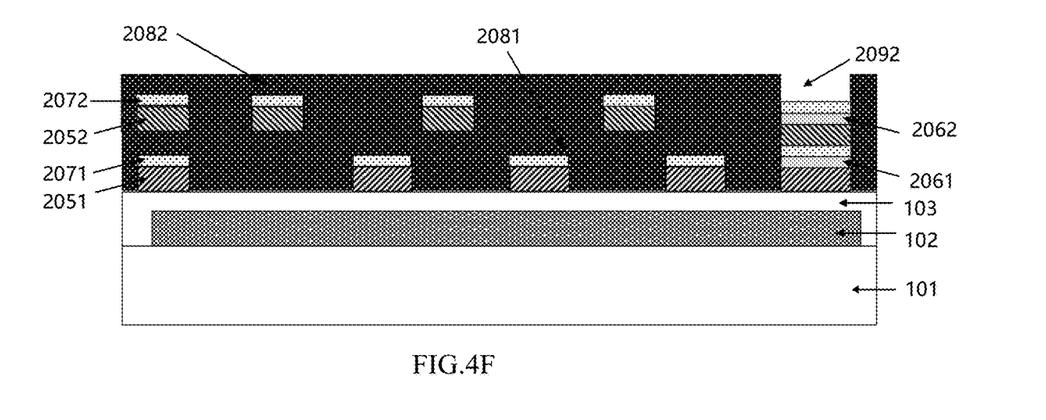

Step 136B: as shown in FIG. 4F, forming a second insulating layer 2082, and forming a second bonding area via-hole 2092 in the second insulating layer 2082, where the second bonding area via-hole 2092 is above the first touch electrode wiring 2061 and the second touch electrode wiring 2062, the second bonding area via-hole 2092 above the first touch electrode is in communication with the first bonding area via-hole 2091.

The second insulating layer 2082 is a protective layer.

The specific steps may include: insulating material coating, Photo, development, baking and other processes.

Figure 4G:
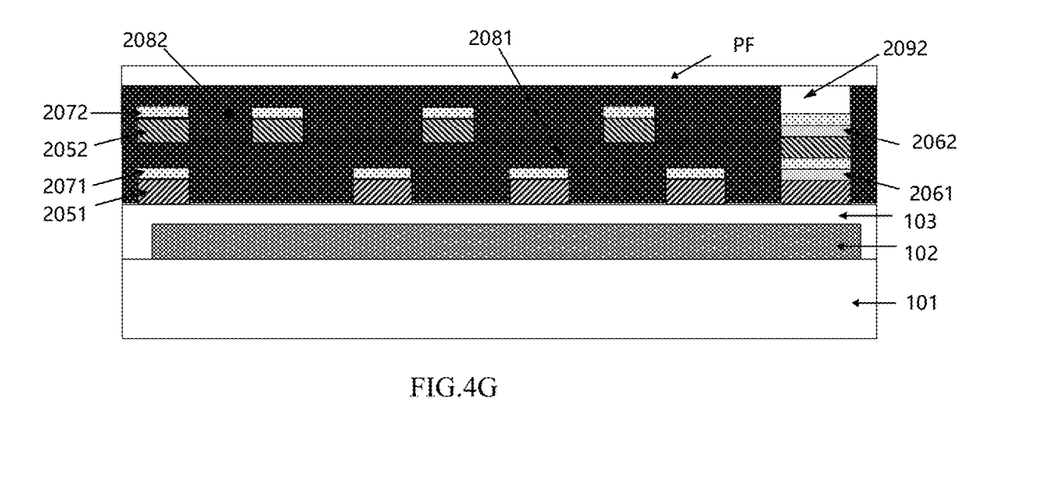

In some embodiments of the present disclosure, the separating the detachable layer from the base layer includes:

Step 141: as shown in FIG. 4G, adhering a protective film (PF) on the formed touch functional layer to protect the touch functional layer.

Step 142: peeling off the detachable layer from the base layer.

In some embodiments of the present disclosure, a mechanical peeling method or a chemical peeling method may be used to peel off the detachable layer from the base layer, then the touch functional component including the base layer and the touch functional layer is remained. Then the detachable layer is removed from the rigid base substrate so that the rigid base substrate may be reused.

In some embodiments of the present disclosure, the step of adhering the touch functional component to the display functional component of the display device through the adhesive includes:

Step 151: providing the display functional component;

Step 152: coating the adhesive onto the display functional component;

If a protective film (PF) is on the surface of the display functional component, a surface protection film of the display functional component may be removed firstly, and then the adhesive is coated onto the display functional component.

Step 153: adhering the touch functional component onto the display functional component through the adhesive;

In some embodiments of the present disclosure, a roll-to-roll device may be used to adhere the touch functional component to the display functional component.

Step 154: curing the adhesive.

In some embodiments of the present disclosure, an ultraviolet (UV) curing method may be used to cure the adhesive to enhance adhesion.

In some embodiments of the present disclosure, after adhering the touch functional component onto the display functional component to form the touch control module, the method may further include: cutting the touch control module into separated touch Control module units (Pcs). Then, subsequent bonding and other processes are performed to complete the forming of the touch control module.

In some embodiments of the present disclosure, the display device is an organic light emitting diode (OLED) display device. If the display device is an OLED display device, the touch control module is adhered to an encapsulation layer (TFE) of the OLED display device.

Figure 3:
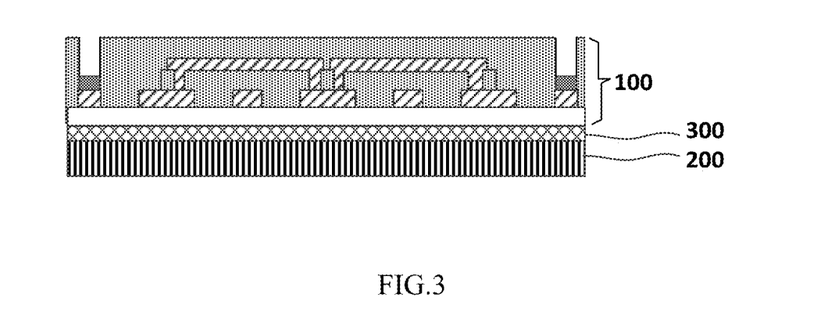
FIG. 3 is a schematic view of a touch control module in an embodiment of the disclosure.

Referring to FIG. 3, a touch control module is further provided in an embodiment of the present disclosure, including:

a display functional component 200 of the display device;

a touch functional component 100 arranged on the display functional component and attached to the display functional component by an adhesive 300, where the touch functional component 100 includes a base layer and a touch functional layer on the base layer. The touch functional layer includes a touch electrode pattern and a touch electrode wiring.

In some embodiments of the present disclosure, the touch control module is a flexible touch control module.

In some embodiments of the present disclosure, the thickness of the base layer is 1 to 5 microns.

In some embodiments of the present disclosure, the thickness of the adhesive is less than 10 microns.

In some embodiments of the present disclosure, the display functional component is a polarizer, a barrier layer or a cover plate.

A touch display device is further provide in an embodiment of the present disclosure, including a display device and a touch control module attached to the display device, where the touch control module is the touch control module in the above embodiment.

In some embodiments of the present disclosure, the display device is an OLED display device.

In some embodiments of the present disclosure, the display device is a flexible OLED display device.

In some embodiments of the present disclosure, the display device may also be a liquid crystal display device. If the display device is a liquid crystal display device, the touch control module is attached to a polarizer (POL) of the liquid crystal display device.

The embodiments of the present disclosure are described above with reference to the drawings, but the present disclosure is not limited to the above embodiments. The above embodiments are only illustrative and not restrictive. For those of ordinary skill in the art, without departing from the principle of the present disclosure and the scope of the claims, many forms can be made, all of which fall within the scope of the present disclosure.

What is claimed is:

1. A method of forming a touch control module, comprising:

providing a rigid base substrate;

forming a base layer on the rigid base substrate;

forming a touch functional layer at a side of the base layer away from the rigid base substrate;

separating the rigid base substrate from the base layer, to form a touch functional component comprising the base layer and the touch functional layer; and adhering the touch functional component to a display functional component of a display device through an adhesive, to form the touch control module, wherein the forming the touch functional layer at the side of the base layer away from the rigid base substrate further comprises:

forming a first touch electrode pattern and a first touch electrode wiring at the side of the base layer away from the rigid base substrate;

forming a first blackened layer pattern at a side of the first touch electrode pattern and the first touch electrode wiring away from the rigid base substrate, wherein an orthographic projection of the first blackened layer pattern onto the rigid base substrate overlaps with orthographic projections of the first touch electrode pattern and the first touch electrode wiring onto the rigid base substrate;

forming a first insulating layer, and forming a first bonding area via-hole in the first insulating layer, wherein the first bonding area via-hole is above the first touch electrode wiring;

forming a second touch electrode pattern and a second touch electrode wiring, wherein the first touch electrode pattern and the second touch electrode pattern form a touch electrode pattern with a metal grid structure;

forming a second blackened layer pattern at a side of the second touch electrode pattern and the second touch electrode wiring away from the rigid base substrate, wherein an orthographic projection of the second blackened layer pattern onto the rigid base substrate overlaps with orthographic projections of the second touch electrode pattern and the second touch electrode wiring onto the rigid base substrate; and forming a second insulating layer, and forming a second bonding area via-hole in the second insulating layer, wherein the second bonding area via-hole is above the first touch electrode wiring and the second touch electrode wiring, the touch functional layer consists of the first touch electrode pattern, the first touch electrode wiring, the first blackened layer pattern, the first insulating layer, the second touch electrode pattern, the second touch electrode wiring, the second blackened layer pattern and the second insulating layer.

2. The method according to claim 1, wherein prior to the forming the base layer on the rigid base substrate, the method further comprises:

forming a detachable layer on the rigid base substrate;
wherein the forming the base layer on the rigid base substrate further comprises:
forming the base layer at a side of the detachable layer away from the rigid base substrate;
wherein the separating the rigid base substrate from the base layer further comprises:
separating the detachable layer from the base layer.

3. The method according to claim 2, wherein the base layer completely covers a surface of the detachable layer away from the rigid base substrate and lateral surfaces of the detachable layer.

4. The method according to claim 3, wherein an orthographic projection of the detachable layer onto the rigid base substrate is within an orthographic projection of the base layer onto the rigid base substrate.

5. The method according to claim 3, wherein at least a portion of the base layer extends to the rigid base substrate and is in direct contact with the rigid base substrate, to enclose the detachable layer into the base layer.

6. The method according to claim 2, wherein a material of the detachable layer comprises polyacrylate or unsaturated polyester.

7. The method according to claim 2, wherein the touch electrode pattern is formed of a transparent metal oxide;
subsequent to the forming the base layer on the rigid base substrate, the method further comprises:
forming an anti-imaging layer at the side of the base layer away from the rigid base substrate.

8. The method according to claim 7, wherein the forming the touch functional layer at the side of the base layer away from the rigid base substrate further comprising:
forming the touch electrode pattern at a side of the anti-imaging layer away from the rigid base substrate, wherein the touch electrode pattern comprises driving electrodes and sensing electrodes, the touch electrode pattern is formed of a transparent metal oxide material;
forming a touch electrode wiring;
forming a first insulating layer, and forming, in the first insulating layer, bridging contact via-holes and a first bonding area via-hole, wherein the bridging contact via-holes are above the driving electrodes or the sensing electrodes, and the first bonding area via-hole is above the touch electrode wiring;
forming a bridging pattern, wherein the bridging pattern is connected to the driving electrodes or the sensing electrodes through the bridging contact via-holes;
forming a second insulating layer, and forming a second bonding area via-hole in the second insulating layer, wherein the second bonding area via-hole is in communication with the first bonding area via-hole, and the touch functional layer consists of the anti-imaging layer, the touch electrode pattern, the touch electrode wiring, the first insulating layer, the bridging pattern and the second insulating layer.

9. The method according to claim 7, wherein a material of the anti-imaging layer comprises Silicon Nitrite Oxide.

10. The method according to claim 1, wherein a material of the base layer comprises polyimide, the touch functional layer comprises a touch electrode pattern;
the forming the touch functional layer at the side of the base layer away from the rigid base substrate further comprises:
forming the touch electrode pattern at the side of the base layer away from the rigid base substrate.

11. The method according to claim 10, wherein subsequent to the forming the touch electrode pattern at the side of the base layer away from the rigid base substrate, the method further comprises:
performing an annealing process to anneal the touch electrode pattern.

12. The method according to claim 1, wherein the adhering the touch functional component to the display functional component of the display device through the adhesive further comprises:
providing the display functional component;
coating the adhesive onto the display functional component;
adhering the touch functional component onto the display functional component through the adhesive; and
curing the adhesive.

13. A touch control module, comprising:
a display functional component of a display device;
a touch functional component, arranged on the display functional component and adhered to the display functional component through an adhesive, wherein the touch functional component comprises: a base layer and a touch functional layer on the base layer;
a first touch electrode pattern and a first touch electrode wiring at the side of the base layer away from the rigid base substrate;
a first blackened layer pattern at a side of the first touch electrode pattern and the first touch electrode wiring away from the rigid base substrate, wherein an orthographic projection of the first blackened layer pattern onto the rigid base substrate overlaps with orthographic projections of the first touch electrode pattern and the first touch electrode wiring onto the rigid base substrate;
a first insulating layer, and a first bonding area via-hole in the first insulating layer, wherein the first bonding area via-hole is above the first touch electrode wiring;
a second touch electrode pattern and a second touch electrode wiring, wherein the first touch electrode pattern and the second touch electrode pattern form a touch electrode pattern with a metal grid structure;
a second blackened layer pattern at a side of the second touch electrode pattern and the second touch electrode wiring away from the rigid base substrate, wherein an orthographic projection of the second blackened layer pattern onto the rigid base substrate overlaps with orthographic projections of the second touch electrode pattern and the second touch electrode wiring onto the rigid base substrate; and
a second insulating layer, and a second bonding area via-hole in the second insulating layer, wherein the second bonding area via-hole is above the first touch electrode wiring and the second touch electrode wiring, the touch functional layer consists of the first touch electrode pattern, the first touch electrode wiring, the first blackened layer pattern, the first insulating layer, the second touch electrode pattern, the second touch electrode wiring, the second blackened layer pattern and the second insulating layer.

14. The touch control module according to claim 13, wherein a thickness of the base layer is 1 to 5 microns.

15. The touch control module according to claim 13, wherein the display functional component is a polarizer, a barrier layer or a cover plate.

16. A touch display device comprising a display device and the touch control module adhered to the display device according to claim 13.

17. The touch control module according to claim 13, wherein a thickness of the adhesive is less than 10 microns.

18. The touch control module according to claim 17, wherein the adhesive comprises acrylic resin, polyurethane or ethoxyline resin.

\* \* \* \* \*